Figures 1, 2:
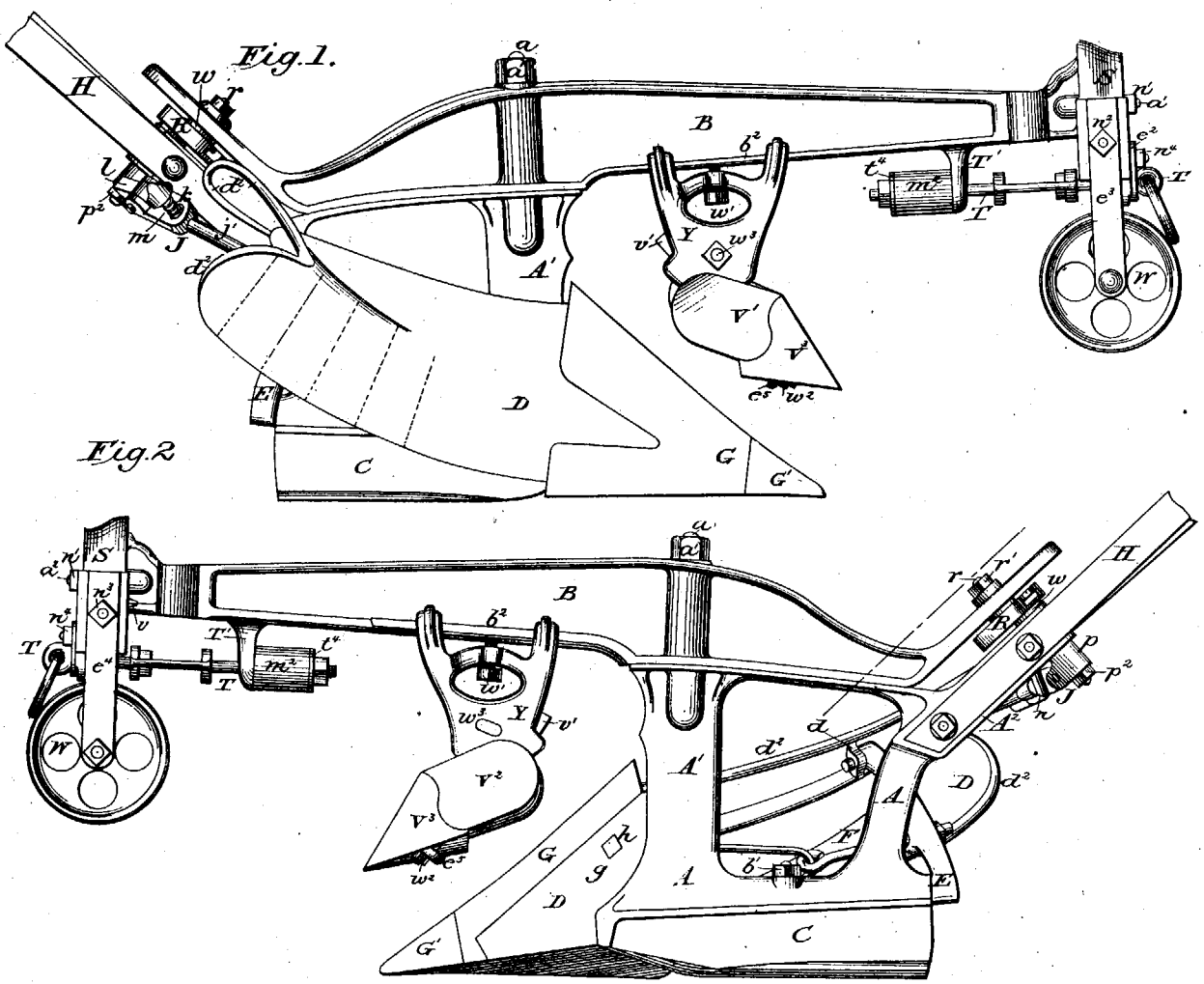

4 Sheets—Sheet 1.

F. F. HOLBROOK & E. S. MOULTON.

Plow.

No. 9,760. Reissued June 14, 1881.

*Witnesses.*

Sidney P. Hollingsworth

W. B. Chapfee

*Inventors.*

Franklin G. Holbrook,
Eri S. Moulton,
By Their Attorneys,
Stansbury & Munn.

N. PETERS, Photo-Lithographer, Washington, D. C.

F. F. HOLBROOK & E. S. MOULTON.
Plow.
No. 9,760. Reissued June 14, 1881.
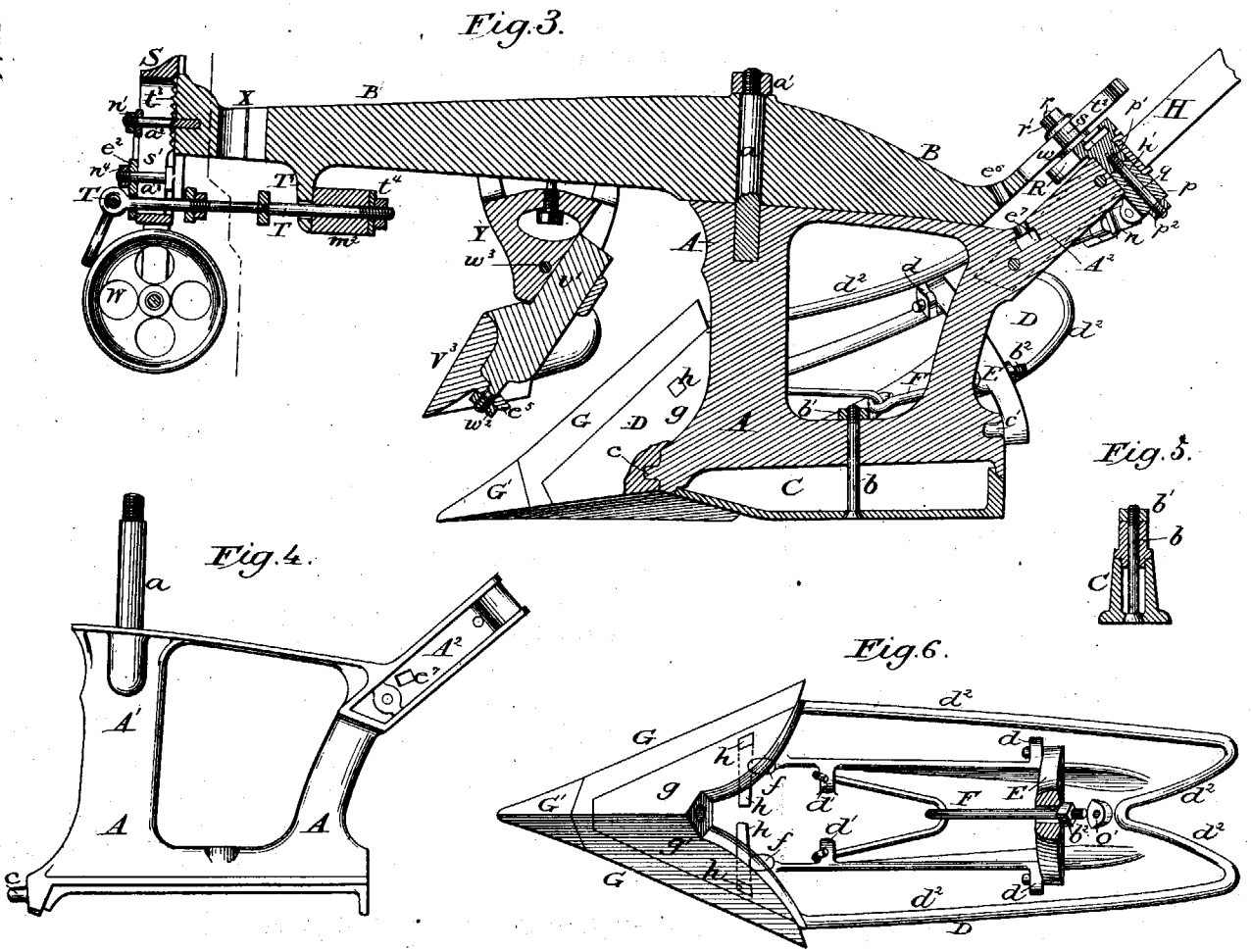
*Witnesses.*
Sidney P. Hollingsworth,
W. E. Clapp
*Inventors.*
F. F. Holbrook,
E. S. Moulton,
By their Attorneys,
Stansbury & Munn
N. PETERS, Photo-Lithographer, Washington, D. C.

F. F. HOLBROOK & E. S. MOULTON.
Plow.
No. 9,760. Reissued June 14, 1881.
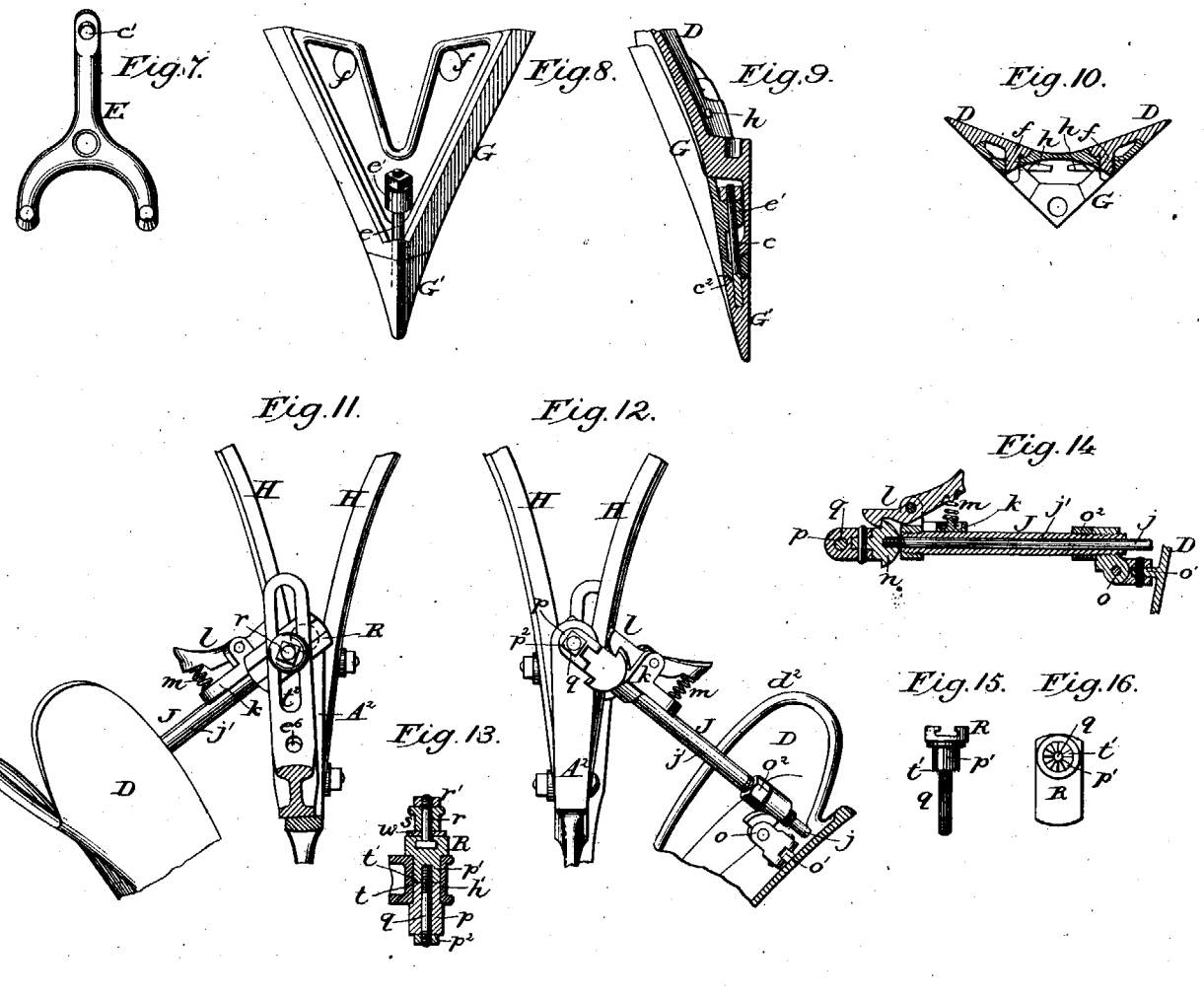
*Witnesses.*
Sidney P. Hollingsworth.
W. E. Hoffee
*Inventors.*
Franklin F. Holbrook
Eri S. Moulton,
By their Attorneys,
Stansbury & Munn
N. PETERS. Photo-Lithographer, Washington, D. C.

F. F. HOLBROOK & E. S. MOULTON.
Plow.
No. 9,760. Reissued June 14, 1881.
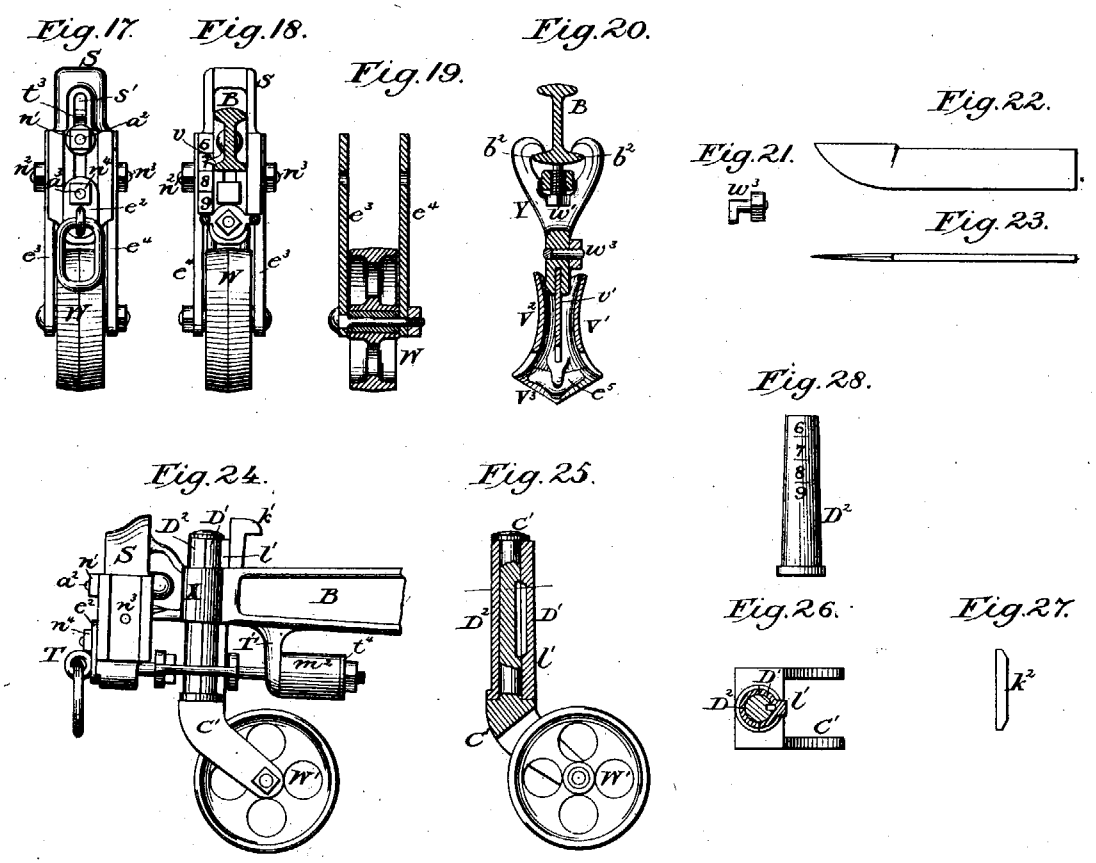
*Witnesses.*
Sidney P. Kellingsworth.
W. C. Chaffee
*Inventors.*
Franklin F. Holbrook,
Eri S. Moulton,
By their Attorneys,
Stansbury & Munn
N. PETERS, Photo-Lithographer, Washington, D. C.

UNITED STATES PATENT OFFICE.

FRANKLIN F. HOLBROOK AND ERI S. MOULTON, OF CHELSEA, MASS.

PLOW.

SPECIFICATION forming part of Reissued Letters Patent No. 9,760, dated June 14, 1881.

Original No. 241,861, dated May 24, 1881. Application for reissue filed May 25, 1881.

*To all whom it may concern:*

Be it known that we, FRANKLIN F. HOLBROOK and ERI S. MOULTON, of Chelsea, in the State of Massachusetts, have invented certain new and useful Improvements in Plows; and we do hereby declare that the following is a full, clear, and exact description of the invention, that will enable others skilled in the art to which it appertains to make and use the same, reference being had to the accompanying drawings, and to the letters of reference marked thereon, which form a part of this specification.

The improvements for the most part relate to that class of plows termed "swivel" or "reversible" plows, but in part they are equally applicable to the ordinary plow.

One part of the improvements consists in an attachment whereby the act of reversing the mold-board adjusts the plow-beam so that two animals harnessed to the plow abreast may walk one in the last furrow, in whichever direction the plow travels, and this branch of the invention includes a supplementary device, whereby the act of reversing a mold-board makes a further adjustment of the plow-beam to meet the requirements of an uneven team or warped beam.

Another part of the invention consists in an improved truss or frame for a plow. Another consists in improved devices for adjusting the draft-rod and wheel; and other parts of the invention consist in details of construction to be hereinafter particularly pointed out.

In the drawings, Figure 1 is an elevation of a reversible plow embodying our improvements, taken upon the mold-board or working side. Fig. 2 is an elevation upon the opposite or land side of the plow. Fig. 3 is a longitudinal sectional elevation. The remaining figures, 4 to 28, represent details in the construction, to several of which especial reference will be made in the description to follow.

A is a truss-frame, its forward part, A′, forming a seat for the plow-beam B, which is pivoted to the truss by means of a stud, *a*, cast in the truss and passing through a corresponding hole in the beam. A nut, *a′*, screwed up to a shoulder upon the stud *a*, forms a top bearing for the beam.

C is a hollow runner-shaped shoe fitting upon the flanged foot of the truss A, and secured thereto by a bolt, *b*, and nut *b′*.

D is the mold board, pivoted to the forward part of the truss A by a swivel-pin, *c*, and to the rear part by means of a dog-brace, E, and a pin, *c′*, of the dog-brace, fitting in a hole in the truss. The dog-brace is forked, as shown, its branches fitting into loops *d d* on the inner side of the mold-board, and it is held in place by a nut, $b^2$, upon a double-hooked dog-rod, F, which hooks into two other loops, *d′ d′*. The strain is distributed by this double hook over a large part of the mold-board. The mold-board D is cast with a strengthening-bead, $d^2$, running around the entire edge of that portion used as a mold-board proper, whereby requisite strength is obtained with a small weight of metal. The mold-board is also so cast that a straight edge will bear on the rear portion or wings of the mold-board at nearly right angles to the edge, as indicated by dotted lines in Fig. 1.

G is a plowshare, and G′ the plow-point, both shown in detail at Figs. 9 and 10, and both being shaped to be used with like effect on either side of the plow. The plow-point G′ has a shank, *e*, passing through a hole in the forward part of the plowshare G, and secured to a boss, *e′*, by a nut, as shown. Additional firmness in the connection is obtained by means of a projection upon the forward end of the share fitting into a recess, $c^2$, in the point.

The forward portion of the mold-board D, upon the furrow side, is shaped to form a seat for the plowshare G. A cross-section of the mold-board in this vicinity is triangular, and its two other faces are shaped to form each a continuous part either of the landside or of the bottom of the plow, as the case may be. The seat for the plowshare (mentioned above) is hollowed out to make room for the boss *e′*, and is grooved to receive the shank *e* of the plow-point.

The plowshare G is cast with two notched studs, *f f*, which, as shown, pass into corresponding holes or sockets in the mold-board, where they are secured by keys *h h* passing into mold-board at key-holes on either face *g g′* thereof. This method of attachment does away with all bolts, projections, or recesses upon the working side of the share.

The mold-board, with the plowshare and plow-point attached, swivels upon the pin $c'$ and the forward end of the plow-point, the runner shape of the shoe C permitting the intermediate swivel-pin, $c$, to lie in the line of the pin $c'$ and the extreme end of the plow-point, and thus a long bearing upon the ground is given to the plow, while the mold-board is carried well up.

H H are the handles, secured to a projecting arm, $A^2$, of the truss, as shown. A tie (shown as connecting the seat $A'$ and the arm $A^2$) gives great strength to the truss as frame of the plow.

J is a device which, as whole, we term the "spring-hook." It is of peculiar construction, and is constantly attached both to the arm $A^2$ of the truss and to the mold-board D, locking on either side of the plow, as required. The spring-hook consists of a telescopic rod in two parts, $j$ $j'$, a latch, $l$, a spring, $m$, and a catch, $n$, the part $j$ being a rod proper, and the part $j'$ being a sleeve having a longitudinal movement upon the rod $j$, and carrying at one end a frame, $k$, which, in turn, carries a latch, $l$, and spring $m$, as shown at Figs. 11, 12, and 14. The rod $j$ is somewhat longer than its sleeve $j'$, and one end is screwed into a double catch-piece, $n$, which is knuckle-jointed to a piece, $p$, whose office will be explained hereinafter. The end of the sleeve $j'$ not carrying the frame $k$ is secured by a double knuckle-joint, $o$, to an ear, $o'$, cast on the mold-board D, as shown in Figs. 12 and 14. A check-nut, $o^2$, determines the length of the sleeve.

R is the regulator-plate, shown in detail at Figs. 15 and 16, Fig. 15 showing also a stud, $q$, screwed into a projection, $p'$, from the under side of the regulator-plate. This projection $p'$ and the piece $p$, before mentioned, form together what we term the "regulator-shank," the stud $q$ passing through a hole in the piece $p$, as shown in Fig. 13, and the two parts $p$ and $p'$ being held together by a nut, $p^2$, on the stud $q$. The regulator-shank thus formed turns in a hole, $h'$, in the arm $A^2$ of the truss. The meeting faces of the parts $p$ and $p'$ have corresponding teeth, $t$ and $t'$, whereby the two faces may meet and be locked by the nut $p^2$ in any required relative position. The lower face of the regulator-plate R, with its projection $p'$, is shown at Fig. 16. Its upper face is furnished with ways, as shown at Figs. 2, 3, 11, 13, and 15, for a sliding bolt, $r$, which has a head to confine it to the ways, and carries a collar, $s$, traveling in a slot, $t^2$, in the rear end of the plow-beam, a washer, $w$, being placed between the collar $s$ and the regulator-plate, as shown in Fig. 13. A nut, $r'$, keeps the collar $s$ in place and secures the bolt $r$ in any required position in the ways of the regulator-plate.

It is obvious that the regulator-shank, consisting of the piece $p$ and projection $p'$, as before stated, turning in the hole $h$, and the knuckle-joint, by which the piece $p$ is secured to the rod $j$, form together a universal joint for one end of the spring-hook J. The universal joint at the other end consists of the double knuckle-joint $o$, before mentioned, and these two universal joints, together with the telescopic rod, permit the mold-board to be swiveled from one side of the plow to the other. When the mold-board is shifted from one side to the other the latch $l$ locks in one side or other of the double catch-piece $n$, as the case may be, by force of the spring $m$. The plowman overcomes the force of this spring and releases the latch by pushing the long arm of the latch with his foot when he wishes to shift the mold-board from one side to the other of the plow.

It is also obvious from the above description that the regulator-plate R will turn whenever the regulator-shank $p$ $p'$ turns, and that this happens whenever the mold-board is shifted from one side to the other of the plow. The bolt $r$, with its collar $s$, turns with the regulator-plate, and may be secured in any position in the regulator-plate. It follows that when the bolt $r$ is so secured that its axis is a prolongation of the regulator-shank, its collar $s$ will simply turn in the slot $t^2$ in the plow-beam; but when the bolt $r$ is so secured that its axis is not a prolongation of the axis of the shank $p$ $p'$ the plate R becomes a crank for the shank $p$ $p'$ and the bolt $r$ a crank-pin, and whenever the regulator-shank is turned the collar $s$ not only turns in the slot $t^2$, but moves longitudinally in it, thereby causing the plow-beam to swivel in its seat and on the stud $a$. The distance to which the bolt $r$ is moved from a prolongation of the axis of the regulator-shank determines the length of the crank above described, and consequently the distance to which the plow-beam may be thrown to the right or the left of its normal position. Accordingly, by means of the telescopic rod of the spring-hook J and an adjustment of the apparatus just described as connected with the upper end of the regulator-shank, to the lower end of which the spring-hook is secured, the act of swiveling the mold-board from one side to the other of the plow may automatically so swivel the plow-beam that one of the draft-animals will walk in the last furrow in whichever direction the plow may travel. For the purposes of this adjustment the regulator-shank may be considered as of one piece, and the regulator-plate as occupying such a position that the axes of the regulator-shank and the bolt $r$ lie in a longitudinal plane half-way between the ways of the regulator-plate, and through the middle of the slot $t^2$ of the plow-beam.

It is for the purposes of another adjustment that the regulator-shank is formed in two parts, the faces of the two parts having corresponding teeth where they meet, as above described. From this construction it follows that by loosening the nut $r'$ the regulator-plate may be turned so that the plane above described will no longer contain both of the above-mentioned axes, and it is evident that by such movement the plow-beam may be thrown slightly to the right or left. The nut $r'$ may then be tightened, and the plow-beam may be automatically thrown to the right and left of this abnormal position by the means above described. The first adjustment is to accommodate the plow to the yoke or evener, the second to accommodate it to the strength of the animals or a warped beam.

S is the clevis, so constructed, however, as to perform the additional function of carrying the wheel-frame. It is held in position by means of a stud, $a^2$, cast in the end of the plow-beam, and passing through a vertical slot, $s'$, in the clevis, and there secured in any required position by means of a washer and a nut, $n'$. The plow-beam has a tooth, $t^3$, fitting into any one of several notches across the rear face of the clevis, to assist in holding the clevis in a required position. The wheel-frame consists of two wrought-iron straps, $e^3$ $e^4$, secured in grooves on either side of the clevis by means of studs $n^2$ $n^3$ and appropriate nuts.

W is the wheel. The axle is furnished with a sleeve, and is secured to the wheel-frame, as shown. The face of the wheel has a double bevel.

T is the draft-rod, furnished with a collar, $t^4$, working against a stand, T', projecting from the plow-beam, the collar $t^4$ being secured by a nut, and a rubber spring, $m^2$, being interposed between the collar and stand. The forward end of the draft-rod passes through a hole in a slide-plate, $e^2$, having an up-and-down motion in the slot $s'$ in the clevis, and being there secured in any required position by a bolt, $a^3$, provided with a nut, $n^4$, as shown.

It will be observed that the adjustment of the clevis by means of the stud $a^2$ and slot $s'$ is a vertical adjustment of the wheel, and may be made according to the depth of the work to be performed. The same adjustment is also an adjustment of the draft-rod; but this rod has an independent adjustment by means of the sliding plate $e^2$.

The clevis or wheel-holder is furnished with a scale, as shown, and the plow-beam with a pointer, $v$, to measure the depth of the work performed, as controlled by the wheel.

Y is a sliding frame, hung upon flanges $b^2$ $b^2$ cast on the plow-beam, and secured in any required position by a set-screw, $w'$, as shown in Figs. 1, 2, 3, and 20. Its purpose is to carry a colter or a jointer. In the figures referred to it is represented as carrying a double jointer of peculiar construction, consisting of a mold-board with two faces, V' and V², and a double point, V³, the said mold-board being cast with a shank, $v'$, the forward end of which is inserted in a hole in a boss, $e^5$, on the under side of the jointer-point V³, where it is secured by a nut, $w^2$, while the upper end is inserted in a slot in the sliding frame Y, where it is secured and adjusted by a clamp-bolt, $w^3$. This jointer always turns two furrows, whether the plow travels in one direction or the other, whereby it follows that the grass-edges of the sods laid over by the plow throughout the field are turned under the sods on both sides.

At Figs. 22 and 23 is shown a colter, the shank of which has the same form as the upper part of the shank $v'$ of the double jointer, above described, and accordingly the colter may be adjusted and held in the frame Y in the same manner as the double jointer. This adjustment in a measure adapts the jointer or colter to the swing of the plow-beam.

When the plow-beam is adjusted obliquely to any considerable extent it frequently happens that the wheel drags or binds. To obviate this difficulty we have made provision in the beam for the introduction of a caster-wheel by making a slot, X, near the end of the beam, for the reception of the caster-wheel frame. The end of the plow-beam fitted with a caster-wheel is shown in Fig. 24. On comparing this figure with Fig. 2 it will be observed that the clevis and draw-bar are the same in both arrangements.

Figs. 25 to 28, inclusive, are in further illustration of the caster-wheel and its employment in the plow-beam.

C' is the caster-wheel frame, or a forked shank for a caster-wheel, W', the fork of the shank furnishing bearings for the wheel, as shown.

D' D² are two halves of a sleeve, making a long bearing for the forked shank C', and held in place in the slot X by a key, $k'$, inserted in a branch of the said slot and pressing against a rib, $l'$, upon the rear half, D', of the sleeve. The other half, D², is furnished with a scale to measure the work, the key $k'$ permitting an adjustment of the sleeve for this purpose. When the caster-wheel is used, and it is desired that its shank shall not turn in the sleeve, it may be prevented by a stop-piece, $k^2$, inserted in part in a slot in the shank, and in part in a corresponding slot in the sleeve.

As before stated, some of the above-described improvements are applicable to a plow having a stationary beam. The beam in the plow described may be made stationary upon the truss-frame by means of the holes $e^6$ $e^7$ in the beam and frame and a bolt and nut.

We claim—

1. The spring-hook J, consisting of a telescopic rod connected by universal joints at one end with the swiveling mold-board, and at the other end with the plow-frame, and one part carrying a spring-latch and the other a double catch, whereby the mold-board may be locked on either side of the plow, substantially as described.

2. The device for automatically swiveling the plow-beam by swiveling the mold-board, consisting of a crank and a crank-pin, the latter working in a slot in the rear of the plow-beam, which swivels on a stud in its seat, and the crank being rigidly secured to a shaft or pivot, which, forming part of a system of universal joints by which the mold-board and frame are connected, turns as the mold-board swivels.

3. The device for automatically adjusting the swiveling plow-beam to the evener or yoke by swiveling the mold-board, consisting of a crank and crank-pin, the latter having a longitudinal adjustment on the crank to determine the length of the crank, and working in a slot in the rear end of the plow-beam, while the crank is rigidly secured to a shaft which is a pivot connected with and turned by swiveling the mold-board, substantially as described.

4. The device for automatically adjusting the plow-beam to the strength of the animals or to a warped beam, consisting of a crank and crank-pin, the latter working in a slot in the rear end of the swiveling plow-beam, while the crank has a swinging adjustment upon, and may be rigidly secured to, its shaft, which is a pivot connected with and turned by the mold-board, substantially as described.

5. The truss-frame J, having a tie which forms a connection between the arm employed as a seat for the beam and the arm to which the handles are attached, substantially as described.

6. The dog-rod F, forked, as described, to distribute the strain over a large portion of the mold-board.

7. The device for securing the plowshare to the mold-board, consisting of the studs *f f*, key *h h*, and key-holes in the mold-board, substantially as described.

8. The frame Y, adjustable on the plow-beam by means of flanges $b^2$ $b^2$, and the set-screw $w'$, substantially as described, for the purpose specified.

9. The double jointer-point $V^3$, in combination with the mold-board of the jointer, having two faces, $V'$ $V^2$, and the shank $v'$, boss $e^5$, and nut $w^2$, substantially as described.

10. The beam B, clevis S, provided with slot $s'$, the stud $a^2$, nut $n'$, straps $e^3$ $e^4$, wheel W, and draft-rod T, substantially as described.

11. The beam B, clevis S, provided with slot $s'$, the stud $a^2$, nut $n'$, straps $e^3$ $e^4$, wheel W, draft-rod T, slide-plate, $e^2$, bolt $a^3$, and nut $n^4$, substantially as described.

12. A double-faced jointer having two fixed mold-boards and an adjustable shank, in combination with the frame Y and plow-beam B, substantially as shown and described.

13. The plow-point $G'$, provided with the triangular recess $c^2$ and the shank $e$, in combination with the share G, having a projection fitting the recess $c^2$, a hole in its forward part, and boss $e'$, to receive and secure the shank $e$, all as and for the purpose described.

14. The shoe or runner C, affording a long and stable bearing to the plow, in combination with the plow-frame, and the mold-board having the raised pivot-bearings, substantially as described.

15. A graduated scale attached to the vertically-adjustable gage-wheel frame or holder, in combination with an index or pointer attached to the plow-beam for the purpose of gaging the depth of the work, as set forth.

In testimony that we claim the foregoing we have hereunto set our hands this 24th day of May, 1881.

FRANKLIN F. HOLBROOK.
ERI S. MOULTON.

Witnesses:
W. W. SWAN,
H. G. OLMSTED.